US 7,426,556 B2

(12) United States Patent
Sankaran et al.

(10) Patent No.: US 7,426,556 B2
(45) Date of Patent: Sep. 16, 2008

(54) METHODS, SYSTEMS, AND PRODUCTS FOR VERIFYING INTEGRITY OF WEB-SERVER SERVED CONTENT

(75) Inventors: Karthiksundar Sankaran, Alpharetta, GA (US); Zakir Patrawala, Atlanta, GA (US); Timothy A. Hill, Roswell, GA (US)

(73) Assignee: AT&T Intellectual Property I, L.P., Wilmington, DE (US)

( * ) Notice: Subject to any disclaimer, the term of this patent is extended or adjusted under 35 U.S.C. 154(b) by 941 days.

(21) Appl. No.: 10/813,475

(22) Filed: Mar. 30, 2004

(65) Prior Publication Data

US 2005/0223082 A1 Oct. 6, 2005

(51) Int. Cl.
*G06F 15/173* (2006.01)

(52) U.S. Cl. .................................................. 709/223

(58) Field of Classification Search ......... 709/223–225; 714/48, 712
See application file for complete search history.

(56) References Cited

U.S. PATENT DOCUMENTS

| | | | |
|---|---|---|---|
| 5,732,218 A | 3/1998 | Bland et al. | |
| 5,870,559 A | 2/1999 | Leshem | |
| 5,926,463 A | 7/1999 | Ahearn | |
| 5,938,729 A | 8/1999 | Cote | |
| 5,958,010 A | 9/1999 | Agarwal | |
| 5,974,445 A | 10/1999 | Pivnichny et al. | |
| 6,018,619 A | 1/2000 | Allard | |
| 6,026,379 A | 2/2000 | Haller | |
| 6,138,157 A | 10/2000 | Welter | |
| 6,253,324 B1 * | 6/2001 | Field et al. .................. 713/187 |
| 6,539,370 B1 | 3/2003 | Chang | |
| 6,564,342 B2 | 5/2003 | Landan | |
| 6,601,066 B1 | 7/2003 | Davis-Hall | |
| 6,631,408 B1 | 10/2003 | Welter et al. | |
| 6,631,411 B1 | 10/2003 | Welter | |
| 6,647,389 B1 | 11/2003 | Fitch | |
| 6,772,208 B1 * | 8/2004 | Dutta ......................... 709/225 |
| 6,895,551 B1 | 5/2005 | Huang et al. | |
| 2002/0097268 A1 | 7/2002 | Dunn et al. | |
| 2002/0116491 A1 | 8/2002 | Boyd | |
| 2002/0156799 A1 | 10/2002 | Markel et al. | |
| 2002/0173857 A1 | 11/2002 | Pabari | |
| 2002/0184363 A1 | 12/2002 | Viavant | |
| 2003/0084143 A1 | 5/2003 | Knoesel | |
| 2003/0115266 A1 | 6/2003 | Sweet | |
| 2003/0221000 A1 | 11/2003 | Cherkasova | |
| 2003/0229677 A1 | 12/2003 | Allan | |

* cited by examiner

*Primary Examiner*—Larry D Donaghue
(74) *Attorney, Agent, or Firm*—Scott P. Zimmerman, PLLC

(57) ABSTRACT

Methods, systems, and products are disclosed for verifying the integrity of web server content. One method receives a request for a Uniform Resource Locator, with the request originating from a referring Uniform Resource Locator. A response to the request is communicated. The method then stores the requested Uniform Resource Locator, the referring Uniform Resource Locator, a status code associated with the response, and a file size associated with the response. Logical rules are applied and a report is generated which pinpoints the URLs in error.

20 Claims, 3 Drawing Sheets

METHODS, SYSTEMS, AND PRODUCTS FOR VERIFYING INTEGRITY OF WEB-SERVER SERVED CONTENT

CROSS-REFERENCE TO RELATED APPLICATIONS

This application relates to the concurrently filed and commonly-assigned U.S. application Ser. No. 10/813,492, of which the "Brief Summary of the Invention" section and the "Detailed Description of the Invention" sections are incorporated herein by reference.

This application also relates to the concurrently filed and commonly-assigned U.S. application Ser. No. 10/813,474, of which the "Brief Summary of the Invention" section and the "Detailed Description of the Invention" sections are incorporated hereon by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers and, more particularly, to data processing system error/fault handling and to multicomputer data transferring.

2. Description of the Related Art

Broken web links are a common problem in the Internet industry. Internet web pages are electronic documents that are retrieved from a web server. A Uniform Resource Locator (URL) identifies the servers that stores/hosts the web page. These web pages, however, may themselves contain embedded links to additional content. When a web page is retrieved from the web server, all the component parts linked to that web page should also be retrievable. Often times, however, one or more links to additional content are broken. That is, when the web page is retrieved, one or more of the embedded links refer to non-existent web pages or web pages with errors. Sometimes the embedded URL address is incorrectly typed. Sometimes the servers storing the embedded content is malfunctioning or not available. Sometimes the servers serve partial pages due to components of the server code malfunctioning. Most times, however, the document located by the embedded URL is not longer stored on the web server. A failed embedded link often results in the familiar Error 404 "Page Not Found." When an embedded links fails, components are missing and the integrity of the web page is lost. The user requesting the web page is frustrated, and the web master responsible for the web page is frustrated. There is, accordingly, a need in the art for methods, systems, and products for verifying the integrity of content served by web servers.

BRIEF SUMMARY OF THE INVENTION

The aforementioned problems, and other problems, are reduced by this invention. This invention comprises methods, computer systems, computer programs, and computer program products that verify the integrity of web content. This invention is a server-resident integrity checking tool that helps identify the errors that cause broken web links and partial pages being served. When a resource is requested from a web server, and the server sends the response, this server-resident integrity checking tool logs in a database the requested Uniform Resource Locator and the referring Uniform Resource Locator. The requested Uniform Resource Locator identifies the web server hosting/storing the requested resource. The referring Uniform Resource Locator, similarly, identifies the Uniform Resource Locator from where the request originates. This invention also logs the status code associated with the response and a file size associated with the response. This invention, then, allows the user (such as an administrator or web master) to pinpoint erroneous links, missing web content, partially-generated pages, pages that display an error message, and other errors by analyzing the logged information and determining which Uniform Resource Locators are generating errors. This invention generates a report containing all the Uniform Resource Locators that are in error, specifies the type of error, and provides the referring Uniform Resource Locator. This report makes the user aware of the errors which may not otherwise be obvious. By eliminating the errors, integrity of the content served by the web server can be improved.

This invention discloses methods, systems, and products for verifying the integrity of web server content. One of the embodiments describes a server-resident content-integrity tool that helps identify integrity problems unknown to a client. One method receives a request for a Uniform Resource Locator, with the request originating from a referring Uniform Resource Locator. A response to the request is communicated. The method then stores in a database the requested Uniform Resource Locator, the referring Uniform Resource Locator, a status code associated with the response, and a file size associated with the response.

Another of the embodiments describes another method for verifying the integrity of web server content. This method receives a request at a web server. The request originates from a referring Uniform Resource Locator. The request requests a resource associated with a requested Uniform Resource Locator. A response to the request is communicated from the web server. The method then stores in a database the requested Uniform Resource Locator, the referring Uniform Resource Locator, a status code associated with the response, and a file size associated with the resource.

Other embodiments of this invention describe a system for verifying the integrity of web server content. The system comprises an Integrity Module stored in a memory device, and a processor communicating with the memory device. The Integrity Module receives a request for a Uniform Resource Locator. The request originates from a referring Uniform Resource Locator. The Integrity Module communicates a response to the request. The Integrity Module stores the requested Uniform Resource Locator, the referring Uniform Resource Locator, a status code associated with the response, and a file size associated with the response.

Other embodiments of this invention describe a computer program product. A computer-readable medium stores an Integrity Module. The Integrity Module receives a request for a Uniform Resource Locator, and the request originates from a referring Uniform Resource Locator. The Integrity Module communicates a response to the request. The Integrity Module stores the requested Uniform Resource Locator, the referring Uniform Resource Locator, a status code associated with the response, and a file size associated with the response.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

Figure 1:
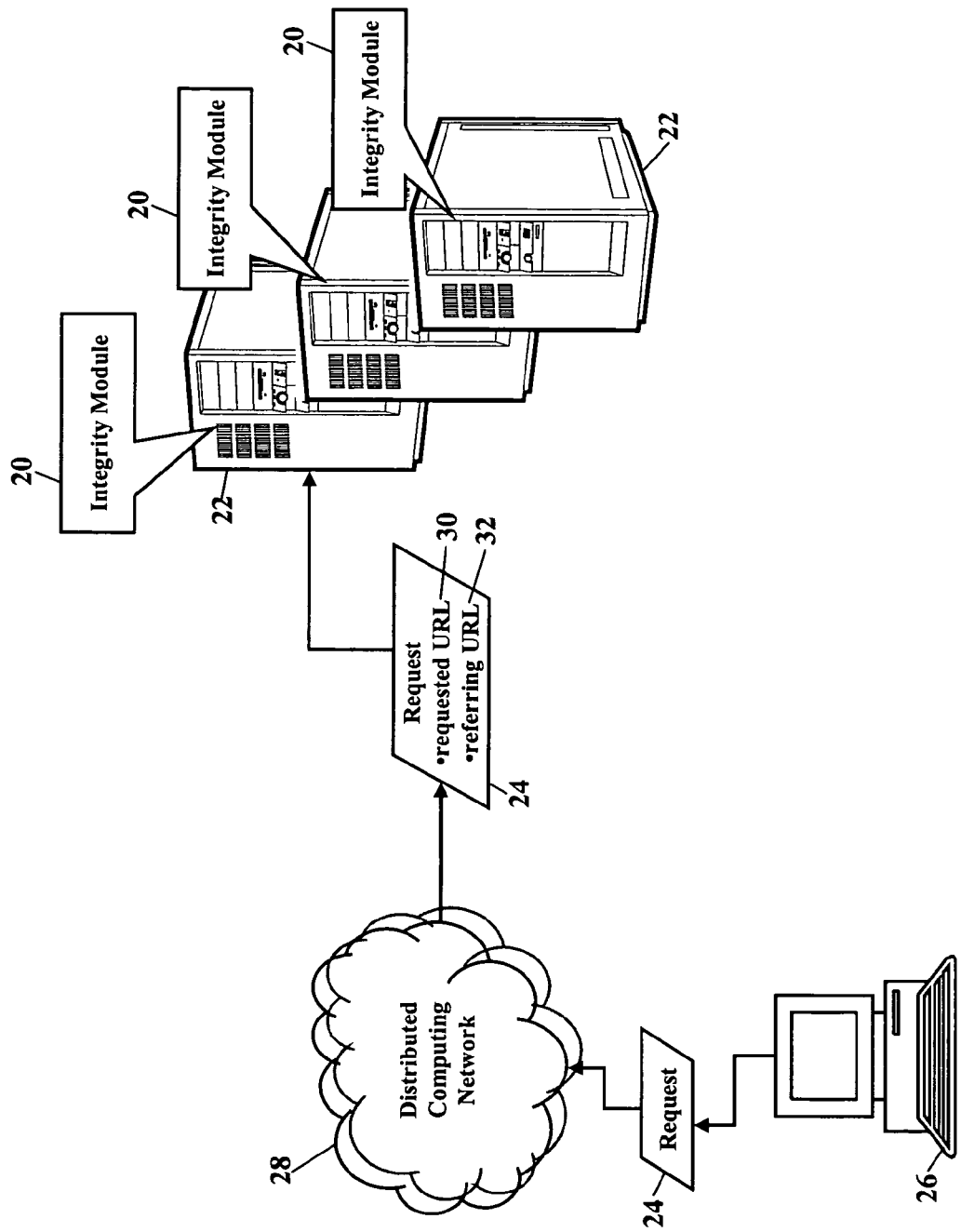
FIGS. 1 and 2 are simplified schematics illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention verifies the integrity of web content. Web servers often serve static and dynamic content. Sometimes the requested content is a static piece of content like a disk file that is served as is, and other times the requested content is a request for content which is dynamically generated. Because the Uniform Resource Locator for dynamic requests depends on user input, this dynamic content cannot be predicted (e.g., a request for a stock quote will have a Uniform Resource Locator corresponding to the stock symbol input by the user). The web server may not be able to generate the correct response to static/dynamic requests due to many reasons, such as the non-availability of required resources, failing software components of the web server, and other problems. These problems result in broken Uniform Resource Locators or pages with partial content being served. This invention, however, operates on a web server and helps identify the errors that cause bad/incomplete content being served. When a resource is requested from a web server, and the web server sends the response, this server-resident integrity checking tool logs in a database the requested Uniform Resource Locator and the referring Uniform Resource Locator. The requested Uniform Resource Locator identifies the web server hosting/storing the requested resource. The referring Uniform Resource Locator, similarly, identifies the Uniform Resource Locator from where the request originates. This invention also logs the status code associated with the response and a file size associated with the response. This invention, then, allows the user (such as an administrator or web master) to pinpoint erroneous links, missing web content, partially generated pages, pages that display an error message, and other errors by analyzing the logged information and determining which Uniform Resource Locators are generating errors. This invention generates a report containing all the Uniform Resource Locators that are in error, specifies the type of error, and provides the referring Uniform Resource Locator. This report makes the user aware of the errors which may not otherwise be obvious. By eliminating the errors, integrity of the content served by the web server can be improved.

Figure 2:
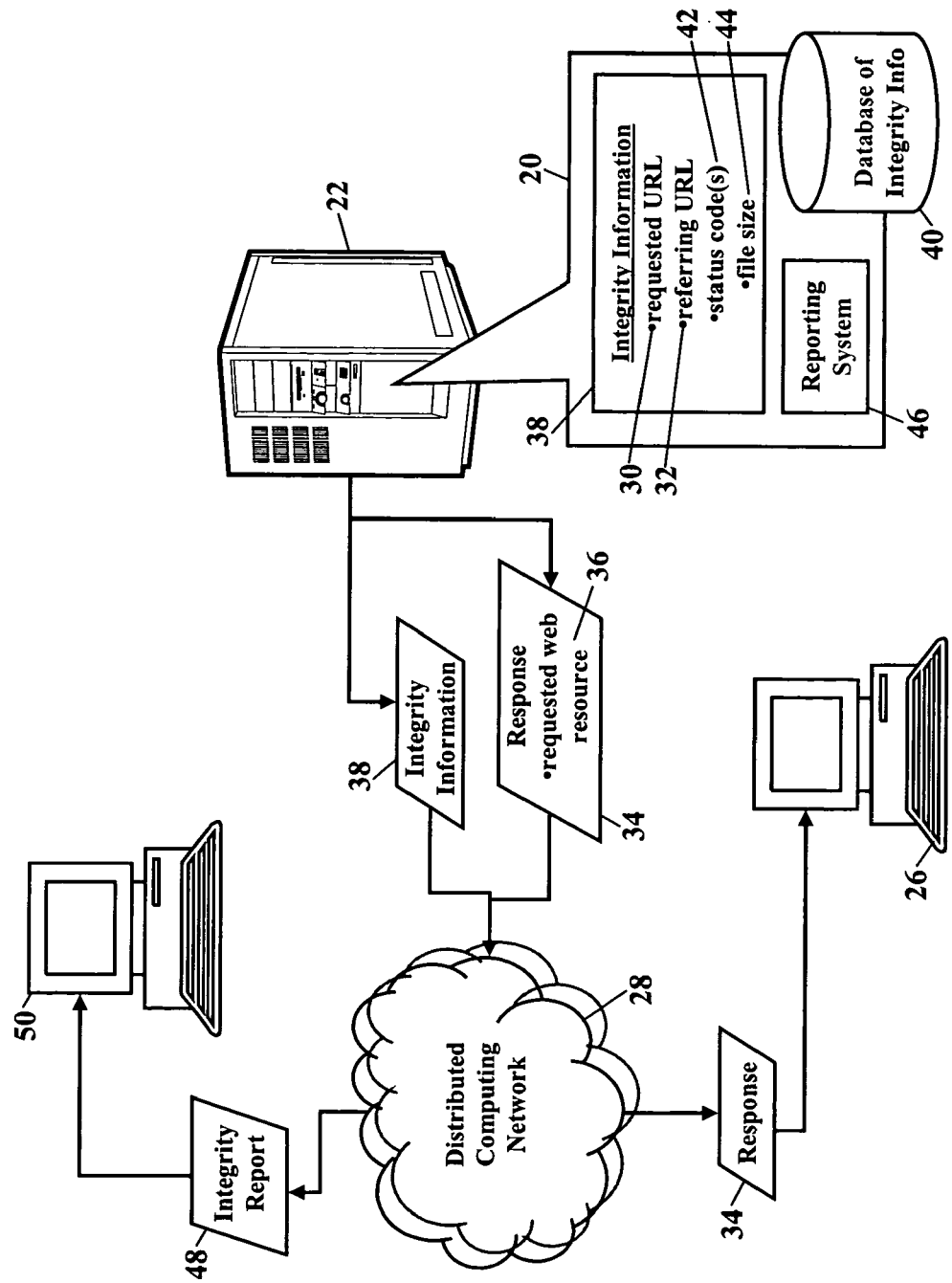

FIGS. 1 and 2 are simplified schematics illustrating this invention. The embodiments of this invention include a server-resident Integrity Module 20. The Integrity Module 20 comprises methods, systems, computer programs, and/or computer program products that verify static and dynamically-generated web server content. The Integrity Module 20 operates within/outside of any computer system, such as one or more web sewers 22. FIG. 1 illustrates the Integrity Module 20 operating within a "web fann" having multiple web servers 22. The web server 22 receives a request 24 for web content from a client computer 26. The request 24 for web content is received via a distributed computing network 28, such as the Internet (sometimes alternatively known as the "World Wide Web"), an intranet, a local-area network (LAN), and/or a wide-area network (WAN). When the request 24 is fulfilled, the Integrity Module 20 helps verify the integrity of the web content This server-resident Integrity Module 20 augments a client-resident integrity checking tool (such as that described in the concurrently filed and commonly-assigned U.S. application Ser. No. 10/813.492(Attorney Docket 030820). Because web hosting is a dynamic environment, a client-resident integrity checking tool cannot generate all the possible permutations and combinations of Uniform Resource Locators (URLs) that may be requested from the web server 22. The web server 22 may host millions of page combinations, depending on, for example, the user name and the user ID. When each user can personalize their page, such as by presenting stocks, weather, and sports, no client-resident integrity checking tool can test all the inputs that are possible. The client-resident integrity checking tool also cannot detect input errors to the web server 22. The server-resident Integrity Module 20, then, provides a more complete tool for verifying static and dynamically-generated web server content.

FIG. 1 illustrates how the server-resident Integrity Module 20 verifies web content. When the web server 22 receives the request 24 for web content from the client computer 26, the Integrity Module 20 first stores/logs the requested Uniform Resource Locator 30 and the referring Uniform Resource Locator 32. The requested Uniform Resource Locator 30 identifies the Internet name and address of a file resource. As those of ordinary skill in the art understand, a Uniform Resource Locator (URL) (or Uniform Resource Identifier) comprises a scheme, such as http or https, a hostname, and a path. The requested Uniform Resource Locator 30, then, identifies the web server 22 hosting/storing the requested resource. The referring Uniform Resource Locator 32, similarly, identifies the URL from where the request 24 originates. Suppose, for example, that a user is viewing the web page www.home.BellSouth.net. If the user then clicks a URL link "stocks," the user's browser would then redirect to a "stocks" web page. In this example, then, the referring Uniform Resource Locator 32 is "www.home.BellSouth.net." The referring Uniform Resource Locator 32 is sometimes termed the "parent" of the requested Uniform Resource Locator 30.

FIG. 2 illustrates a response 34. When the web server 22 receives the request (shown as reference numeral 24 in FIG. 1) for web content from the client computer 26, the web server 22 retrieves the requested web resource 36. The web resource 36 is typically a computer file containing web content. The web server 22 then return communicates the response 34 via the distributed computing network 28.

Before, during, or after the response 34 is communicated, the Integrity Module 20 stores server-side integrity information 38. The Integrity Module 20 stores the server-side integrity information 38 in a database 40 of integrity information. FIG. 2 shows the database 40 of integrity information communicating with the Integrity Module 20. The database 40 of integrity information, however, could be remotely located on the distributed computing network 28. Wherever the database 40 of integrity information is located, the Integrity Module 20 logs into the database 40 the requested Uniform Resource Locator 30 and the referring Uniform Resource Locator 32. The Integrity Module 20 also logs a status code 42 associated with the response and a file size 44 associated with the response. Once the server-side integrity information 38 is obtained, a reporting system 46 generates an integrity report 48. If the requested Uniform Resource Locator 30 is erroneous, the reporting system 46 presents/tabulates the requested Uniform Resource Locator 30 by the referring Uniform Resource Locator 32. If the status code 42 indicates an error, the reporting system 46 presents/tabulates the requested Uniform Resource Locator 30 and the referring Uniform Resource Locator 32 with the status code 42. The reporting system 46 may also present/tabulate the requested Uniform Resource Locator 30 and the referring Uniform Resource Locator 32 according to the number of times the erroneous status code occurs. The integrity report 48 is then communicated to a user at a user computer 50 via the distributed computing network 28. The integrity report 48 is presented at the user computer 50, thus allowing the user to view and correct any integrity errors.

The status code 42 helps identify errors. The status code 42 is a code returned by the web server 22 to the client computer 26. The status code 42 describes the resultant outcome of the request 24 for web content from the client computer 26. An example of the status code 42 would be the Hyper-Text Transfer Protocol (HTTP) status codes routinely exchanged in a client-server environment. Although there are many HTTP status codes, and new codes are being developed, the existing HTTP status codes can be broadly described. The 100-series status codes (e.g., 100 & 101) are informational. The 200-series status codes (e.g., 200-206) describe a successful communication. The 300-series status codes describe redirected resources. The 400-series of status codes outline various client-side errors, and the 500-series outlines server-side errors. Because the HTTP status codes are well-known to those of ordinary skill in the art, these HTTP status codes will not be further discussed. Those of ordinary skill in the art also recognize that the principles of this invention may utilize any scheme for describing the communications outcomes in a client-server environment. The HTTP status codes are only one example.

The Integrity Module 20 also logs the file size 44 associated with the response. The Integrity Module 20 stores/logs/records the file size of the web resource 36 return communicated to the client computer 26. If the file size of the web resource 36 returned to the client computer 26 is zero bytes, then the Integrity Module knows the web resource 36 was not properly sent. If the Integrity Module 20 and/or the web server 22 asserts the size of the web resource 36 to be three kilobytes (3 KB), yet the web resource 36 is only fifty (50) bytes, then the Integrity Module 20 knows something is wrong with the requested Uniform Resource Locator 30.

As FIG. 2 shows, the integrity information 38 helps identify and resolve integrity errors. For each transaction of the web server 22, the database 40 of integrity information stores information that helps verify the integrity of the web resource. The Integrity Module 20 stores/logs the requested Uniform Resource Locator 30, the referring Uniform Resource Locator 32, the status code 42, and the file size 44. The Integrity Module then invokes various logical rules to help identify integrity errors. If the file size of the web resource 36 is zero (0) bytes, then the Integrity Module knows the web resource 36 was not properly sent. If the file size is smaller than expected, then an error may be present. If the status code designates an error (such as the 500-series server-side error codes), then the Integrity Module 20 can flag the error. Whatever the error, the Integrity Module 20 can produce/present/report complete details of the server transaction. The logic rules, then, can be written to flag any error and to produce any visual and/or printed report.

Figure 3:
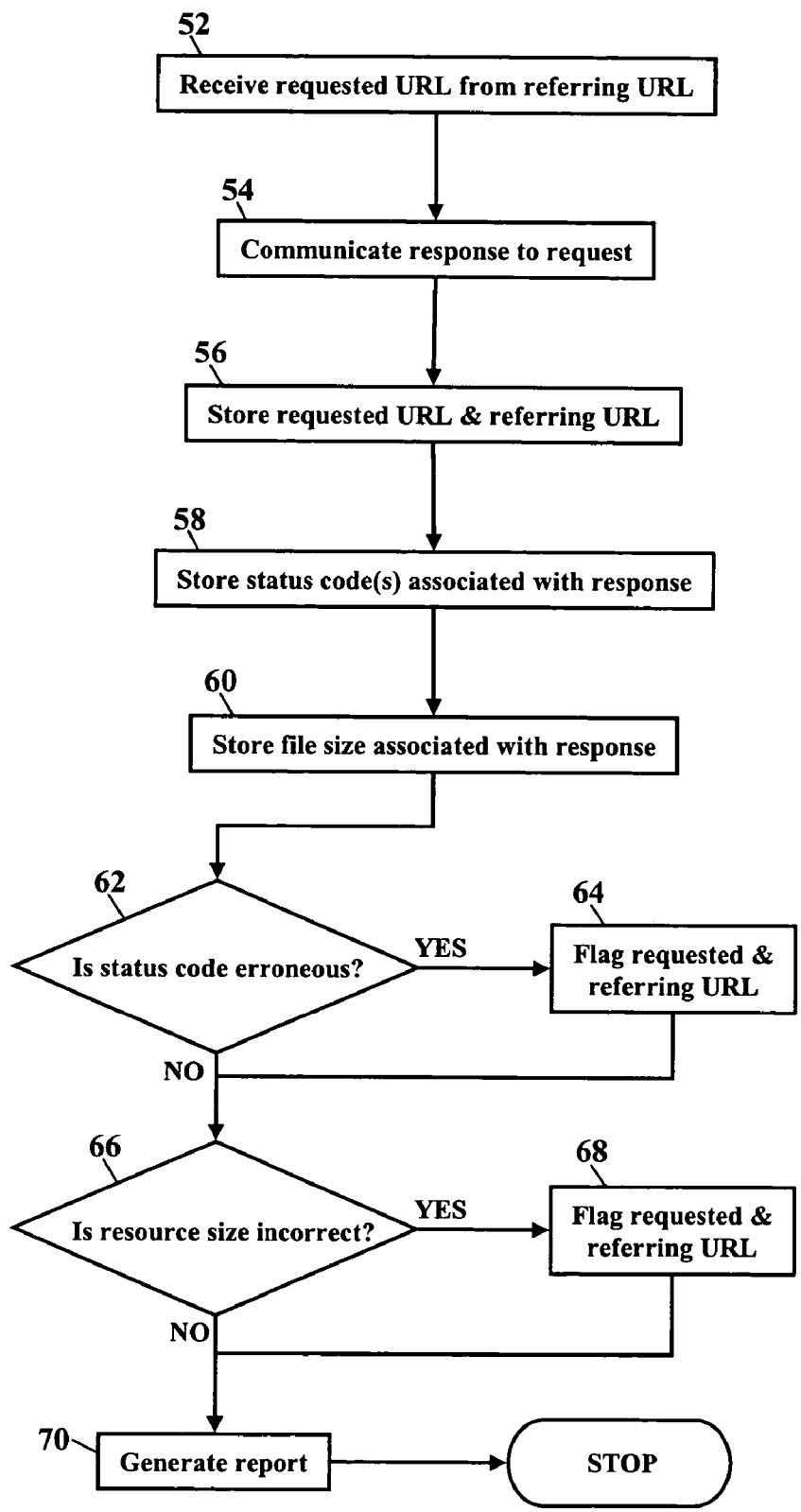
FIG. 3 is a flowchart illustrating a method of verifying the integrity of web server content, according to the embodiments of this invention.

FIG. 3 is a flowchart illustrating a method of verifying the integrity of web server content. A request for a Uniform Resource Locator ("URL") is received (Block 52). The request originates from a referring Uniform Resource Locator ("URL"). A response to the request is communicated (Block 54). The method stores in a database the requested Uniform Resource Locator and the referring Uniform Resource Locator (Block 56). The database also stores the status code associated with the response (Block 58) and the file size associated with the response (Block 60). If the status code indicates an error (Block 62), the requested URL and the referring URL are flagged (Block 64). If the size of the resource is incorrect (Block 66), the requested URL and the referring URL are similarly flagged (Block 68). A report is then generated/presented (Block 70). This report presents all the Uniform Resource Locators that have an associated erroneous status code or an incorrect file size. The report tabulates the erroneous Uniform Resource Locators by the referring Uniform Resource Locator and by the number of times each has occurred. The user may then use this information to correct integrity errors in the web content.

The Integrity Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Integrity Module to be easily disseminated. A computer program product for verifying the integrity of web server content includes the Integrity Module stored on the computer-readable medium. The Integrity Module receives a request for a Uniform Resource Locator. The request originates from a referring Uniform Resource Locator. When a response to the request is communicated, the Integrity Module stores in a database the requested Uniform Resource Locator, the referring Uniform Resource Locator, a status code associated with the response, and a file size associated with the response.

The Integrity Module may also be physically embodied on or in any addressable (e.g., HTTP, I.E.E.E. 802.11, Wireless Application Protocol (WAP)) wireline or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   receiving, at a server, a request from a client for a Uniform Resource Locator, the request originating from a referring Uniform Resource Locator;
   communicating a response to the request;
   receiving, at the server, a result of a web page integrity verification performed by the client;
   identifying, at the server, a server-side error in the web page; and
   storing in a database the requested Uniform Resource Locator, the referring Uniform Resource Locator, the result of the client's web page integrity verification, and the server-side error to determine if an error exists.

2. A method according to claim 1, further comprising storing a status code associated with the response.

3. A method according to claim 1, further comprising storing a file size associated with the response.

4. A method according to claim 1, further comprising storing in the database a status code associated with the response and a file size associated with the response.

5. A method according to claim 1, wherein if the response contains no data, then storing in the database the referring Uniform Resource Locator.

6. A method according to claim 1, further comprising presenting to a user at least two of 1) the requested Uniform Resource Locator, 2) the referring Uniform Resource Locator, 3) a status code associated with the response, and 4) a file size associated with the response.

7. A method for verifying the integrity of web server content, comprising:
   receiving a request at a web server, the request originating from a referring Uniform Resource Locator and requesting a resource associated with a requested Uniform Resource Locator;
   communicating a response to the request;
   receiving, at the web server, a result of a web page integrity verification performed at a client;
   identifying, at the web server, a server-side error in the resource; and
   storing in a database the requested Uniform Resource Locator, the referring Uniform Resource Locator, a status code associated with the response, the result of the client's web page integrity verification, and a file size associated with the resource.

8. A method according to claim 7, wherein if the status code is erroneous, then presenting the requested Uniform Resource Locator with the referring Uniform Resource Locator.

9. A method according to claim 7, wherein if the file size is incorrect, then presenting the requested Uniform Resource Locator with the referring Uniform Resource Locator.

10. A method according to claim 7, further comprising presenting to a user at least two of 1) the requested Uniform Resource Locator, 2) the referring Uniform Resource Locator, 3) a status code associated with the response, and 4) a file size associated with the response.

11. A system, comprising:
    means for receiving, at a server, a request from a client for a Uniform Resource Locator, the request originating from a referring Uniform Resource Locator;
    means for communicating a response to the request;
    means for receiving, at the server, a result of a web page integrity verification performed by the client;
    means for identifying, at the server, a server-side error in the web page; and
    means for storing in a database the requested Uniform Resource Locator, the referring Uniform Resource Locator, the result of the client's web page integrity verification, and the server-side error to determine if an error exists.

12. A computer program product comprising a computer readable medium storing processor executable instructions for performing a method, the method comprising:
    receivng, at a server, a request from a client for a Uniform Resource Locator, the request originating from a referring Uniform Resource Locator, the requested Uniform Resource Locator identifying a device hosting the requested resource, and the referring Uniform Resource Locator identifying a client from where the request originates;
    communicating a response to the request;
    receiving, at the server, a result of a web page integrity verification performed by the client from a configurable file providing user specified frequency and levels of analysis of starting web pages;
    identifying, at the server, a server-side error in the web page;
    merging the result of the client's web page integrity verification with the server-side error; and
    storing in a database the requested Uniform Resource Locator, the referring Uniform Resource Locator, the result of the client's web page integrity verification, and the server-side error to determine if an error exists.

13. The computer program product according to claim 12, further comprising instructions for reporting the requested Uniform Resource Locator, the referring Uniform Resource Locator, the result of the client's web page integrity verification, and the server-side error.

14. The computer program product according to claim 12, further comprising instructions for receiving an error message from the client that indicates existence of a partial page error.

15. The computer program product according to claim 12, further comprising instructions for when a file size of the web page is smaller than expected, then reporting an error.

16. The computer program product according to claim 12, further comprising instructions for reporting the referring Uniform Resource Locator associated with the web page.

17. The computer program product according to claim 12, further comprising instructions for sorting the merged results according to the referring Uniform Resource Locator associated with the web page.

18. The computer program product according to claim 12, further comprising instructions for sorting the merged results according to the requested Uniform Resource Locator associated with the web page.

19. The computer program product according to claim 12, further comprising instructions for when a requested Uniform Resource Locator is erroneous, then reporting a referring Uniform Resource Locator.

20. The computer program product according to claim 12, further comprising instructions for when the web page contains no data, then reporting a requested Uniform Resource Locator.

* * * * *